United States Patent
Lee

(10) Patent No.: US 8,711,232 B2
(45) Date of Patent: Apr. 29, 2014

(54) DIGITAL CAMERA SUPPORTING INTELLIGENT SELF-TIMER MODE AND METHOD OF CONTROLLING THE SAME

(75) Inventor: Jang-won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 12/648,705

(22) Filed: Dec. 29, 2009

(65) Prior Publication Data

US 2010/0165128 A1    Jul. 1, 2010

(30) Foreign Application Priority Data

Dec. 31, 2008  (KR) .................. 10-2008-0138409

(51) Int. Cl.
*H04N 5/228* (2006.01)
*H04N 5/232* (2006.01)

(52) U.S. Cl.
USPC ............... 348/208.4; 348/208.1; 348/222.1; 348/241

(58) Field of Classification Search
None
See application file for complete search history.

(56) References Cited

U.S. PATENT DOCUMENTS

| | | | |
|---|---|---|---|
| 7,855,731 B2 * | 12/2010 | Yu | 348/208.6 |
| 2004/0130628 A1 * | 7/2004 | Stavely | 348/208.4 |
| 2008/0220809 A1 * | 9/2008 | Hansen | 455/550.1 |
| 2009/0027513 A1 * | 1/2009 | Sako | 348/222.1 |
| 2009/0079844 A1 * | 3/2009 | Suzuki | 348/222.1 |
| 2010/0026830 A1 * | 2/2010 | Kim | 348/222.1 |

FOREIGN PATENT DOCUMENTS

JP    2008306404 A   * 12/2008

* cited by examiner

*Primary Examiner* — Twyler Haskins
*Assistant Examiner* — Dwight C Tejano
(74) *Attorney, Agent, or Firm* — Drinker Biddle & Reath LLP

(57) ABSTRACT

Provided are a digital camera supporting an intelligent self-timer, which pauses an image capturing operation when an unwanted subject enters a subject composition and starts the image capturing operation later, and a method of controlling the digital camera. The digital camera includes a motion calculating unit which calculates degree of motions observed in image frames that are obtained in a chronologically successive manner, and an image capture start determining unit which determines whether to start an image capturing operation or not based on whether entry of an unwanted subject is detected or not from the calculated degree of motions and whether a set self-timer time is over or not.

16 Claims, 7 Drawing Sheets

VII

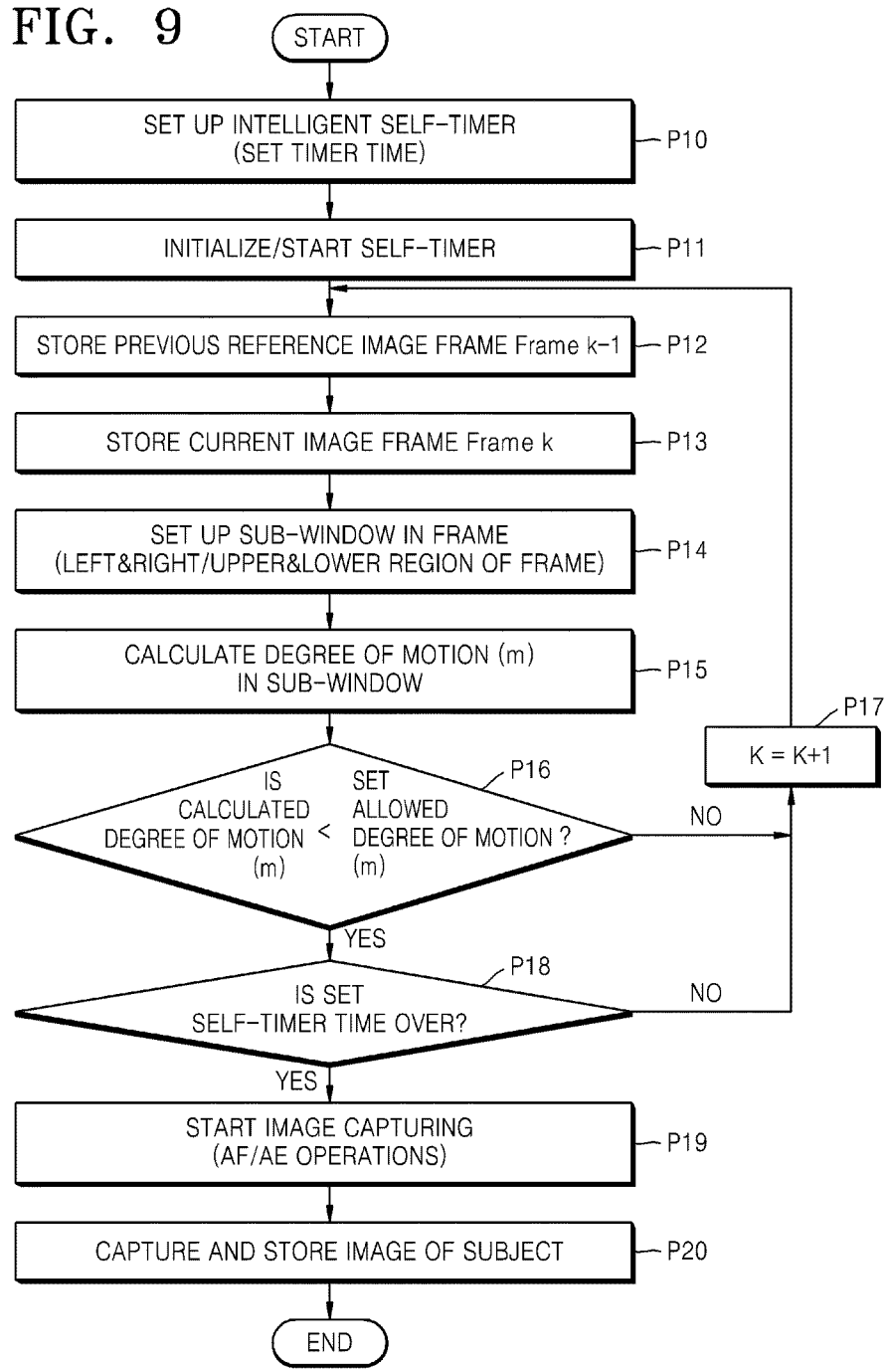

DIGITAL CAMERA SUPPORTING INTELLIGENT SELF-TIMER MODE AND METHOD OF CONTROLLING THE SAME

CROSS-REFERENCE TO RELATED PATENT APPLICATION

This application claims the benefit of Korean Patent Application No. 10-2008-0138409, filed on Dec. 31, 2008, in the Korean Intellectual Property Office, the disclosure of which is incorporated herein in its entirety by reference.

BACKGROUND

The present invention relates to a digital camera and a method of controlling the same, and more particularly, to a digital camera supporting an intelligent self-timer, which pauses an image capturing operation when an unwanted subject enters a subject composition and starts the image capturing operation later, and a method of controlling the digital camera.

From among various functions of a camera, a self-timer is a type of time-delaying function to capture an image a predetermined time period after the self-timer starts, and is used for image stabilization or is used for a user to capture an image of oneself.

However, since such an image capture using a self-timer is generally performed in the open air, a user is apart from the camera by a long distance, and the waiting time until image capturing begins varies—thus unwanted images are often captured. In other words, since the camera and a subject are apart from each other by a long distance, when an image is to be captured in the open air where there are a lot of objects passing by, an unwanted subject may interrupt capturing an image of a subject at a time point at which the time of the self-timer is over, and thus an image of the subject either needs to be captured again or cannot be captured by using the self-timer at busy surroundings.

SUMMARY

Various embodiments of the present invention provide a digital camera supporting an intelligent self-timer, which pauses an image capturing operation when an unwanted subject enters a subject composition and starts the image capturing operation after the unwanted subject is excluded, and a method of controlling the digital camera According to an aspect of the present invention, there is provided a digital camera including a motion calculating unit which calculates a degree of motions observed in image frames that are obtained in a chronologically successive manner; and an image capture start determining unit which determines whether to start an image capturing operation or not based on whether entry of an unwanted subject is detected or not from the calculated degree of motions and whether a set self-timer time is over or not.

The digital camera may further include a window setting unit which sets up at least one sub-window in the image frame, and wherein the motion calculating unit calculates motion vectors within the set sub-window. Here, the window setting unit may set the sub-window in at least one of left, right, upper, and lower regions of an image frame, in which an unwanted subject is likely to be located.

When it is determined that there is no unwanted subject and the set self-timer time is over, the image capture start determining unit may output a signal instructing to start the image capturing operation.

The motion calculating unit may extract feature points constituting edges by applying a Gaussian filter, and may calculate motion vectors from feature points matching between chronologically successive frames.

The image capture start determining unit may mutually determine entry of an unwanted subject based on the comparison between the calculated degree of motion and the pre-set degree of motion. Here, the pre-set allowed degree of motion may be input by a user.

The self-timer time may be input by a user.

According to another aspect of the present invention, there is provided a method of controlling a digital camera, the method including calculating motions observed in image frames that are obtained in a chronologically successive manner; determining whether an unwanted subject entered an image or not based on the calculated motions; determining whether a set self-timer time is over or not; and determining whether to start an image capturing operation or not based on the determinations regarding the unwanted subject and self-timer time.

When it is determined that there is no unwanted subject and the set self-timer time is over, a signal instructing to start the image capturing operation may be output in the determination of whether to start the image capturing operation or not.

The method may further include setting up at least one sub-window in the image frame, wherein motion vectors are calculated within the set sub-window during the calculating of the motions. The sub-window is set up in at least one of left, right, upper, and lower regions of an image frame, in which an unwanted subject is likely to be located.

Feature points constituting edges are extracted by applying a Gaussian filter, and motion vectors are calculated from feature points matching between chronologically successive frames.

BRIEF DESCRIPTION OF THE DRAWINGS

The above and other features and advantages of the present invention will become more apparent by describing in detail exemplary embodiments thereof with reference to the attached drawings in which:

FIG. 9 is a flowchart of a method of controlling a digital camera, according to another embodiment of the present invention.

DETAILED DESCRIPTION OF THE EMBODIMENTS

Hereinafter, a digital camera and a method of controlling the same, according to the present invention, will be described in detail by explaining exemplary embodiments of the invention with reference to the attached drawings. Throughout the present invention, the term "digital camera" refers to a digital mobile apparatus having optimum image capturing functions, not only narrowly including devices that are classified as cameras based on their configuration, but also including portable digital apparatuses that capture images, e.g. camcorders, cellular phones, personal digital assistants (PDA).

Figure 1:
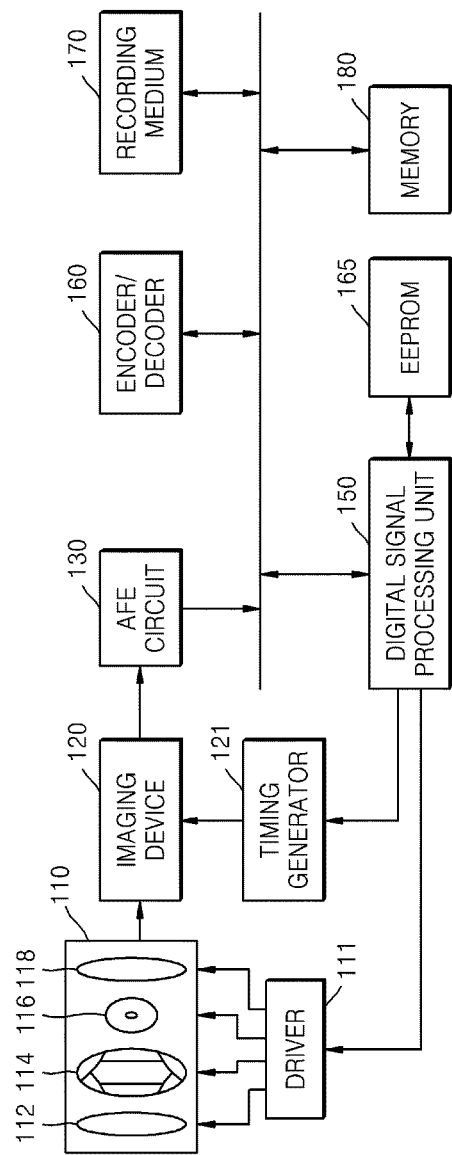
FIG. 1 is a block diagram generally showing the overall configuration of a digital camera according to an embodiment of the present invention.

FIG. 1 is a diagram generally showing the overall configuration of a digital camera according to an embodiment of the present invention. The digital camera shown in FIG. 1 includes an optical unit 110 which includes a plurality of optical lenses for forming an image of a subject on an imaging surface of an imaging device 120, an imaging device 120 for converting a subject image from the optical unit 110 to electrical image signals, an analog front end (AFE) circuit 130 for processing signals output by the imaging device 120 and converting the signals to digital image signals, a memory 180, such as a dynamic random access memory (DRAM), for temporarily storing the digital image signals to provide a workspace for data processing, a recording medium 170 in which image data of a subject is stored as either still image files or motion picture files, and a digital signal processing unit 150, which generally controls overall data flow and each of the components of the digital camera.

The optical unit 110 includes a zoom lens 112, which moves back and forth along the optical axis to change a focal distance, a shutter 114 and an iris 116 for controlling exposure time and the amount of light incident to the imaging device 120, and a focus lens 118 for controlling the focal point of a subject image formed on the imaging device 120. The zoom lens 112, the shutter 114, the iris 116, and the focus lens 118 may be driven by an actuating motor (not shown) controlled by a driver 111.

For example, the imaging device 120 is either a charged-coupled device (CCD) or a complementary metal-oxide semiconductor (CMOS) image sensor, and converts a subject image incident to the imaging device 120 from the optical unit 110 into electrical image signals. Operations of the imaging device 120 may be controlled by the digital signal processing unit 150 using a timing generator (TG) 121.

The AFE circuit 130 converts analog image signals output by the imaging device 120 into digital image signals by performing correlated double sampling (CDS) and analog digital conversion (ADS) on the analog image signals. The digital image signals are transmitted to an encoder/decoder 160 to be converted into encoded data according to a predetermined compression method, and are stored in the recording medium 170. The memory 180 provides a workspace for the encoder/decoder 160 and the digital signal processing unit 150 to process data. Furthermore, the memory 180 may temporarily store chronologically successive frames and provide a workspace for detecting motion vectors.

The digital signal processing unit 150 executes a program recorded in an electronically erasable and programmable read-only memory (EEPROM) for general control of each component of a digital camera and for performing various processes. The digital signal processing unit 150 particularly performs an intelligent self-timer operation by detecting entry of an unwanted subject into a subject composition, pausing an image capturing operation, and starting the image capturing operation after an unwanted subject is excluded, thus preventing an error of capturing an image of an unwanted subject. In other words, the digital signal processing unit 150 does not unconditionally start an image capturing operation at the time a self-timer time set by a user ends. Rather, when an unwanted subject entering a subject composition is detected, the digital signal processing unit 150 delays the image capturing operation, and stars the image capturing operation when the unwanted subject is out of the subject composition.

Figure 2:
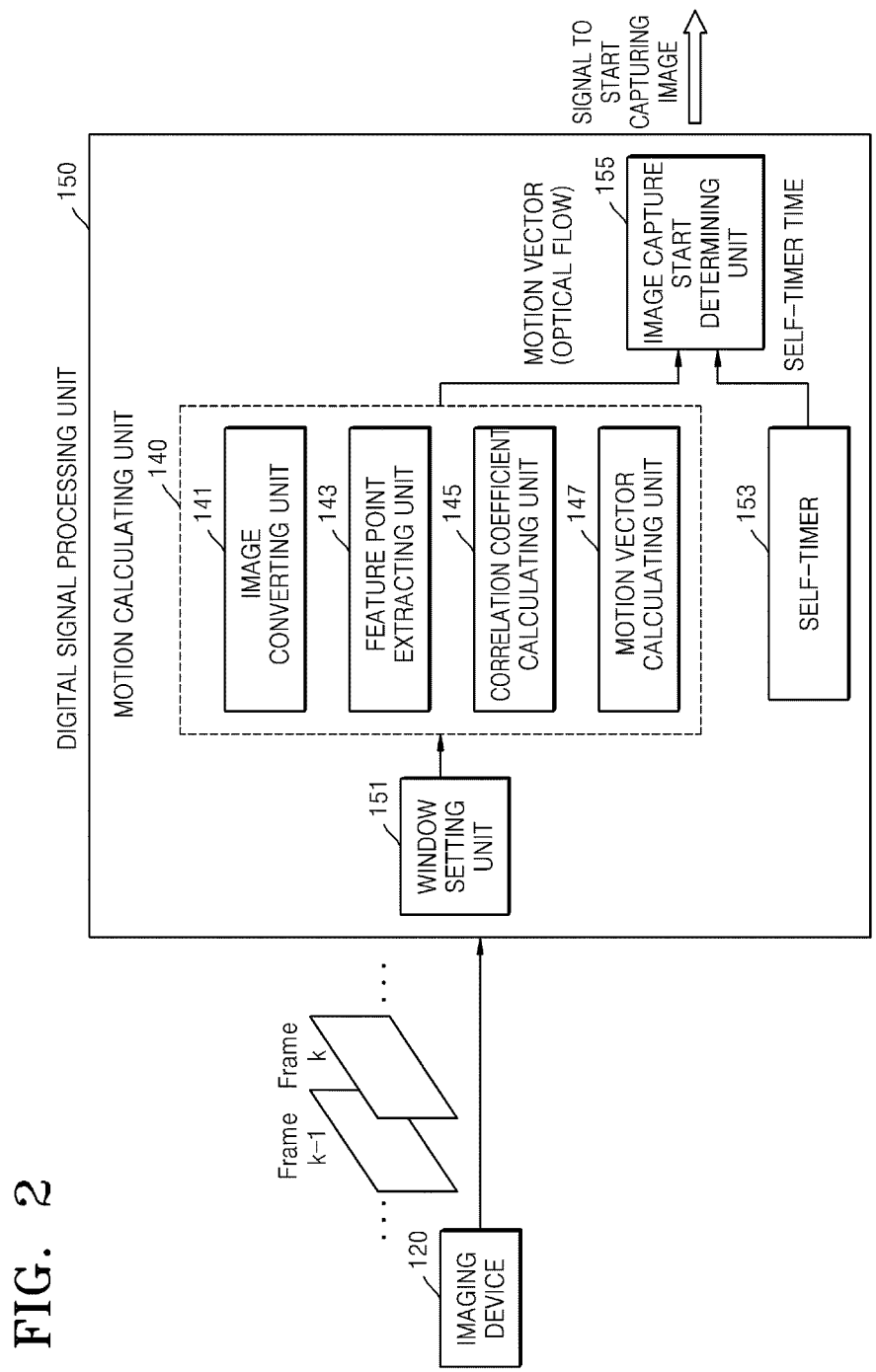
FIG. 2 is a block diagram showing a detailed configuration of the digital signal processing unit to describe an intelligent self-timer operation.
Figure 3:
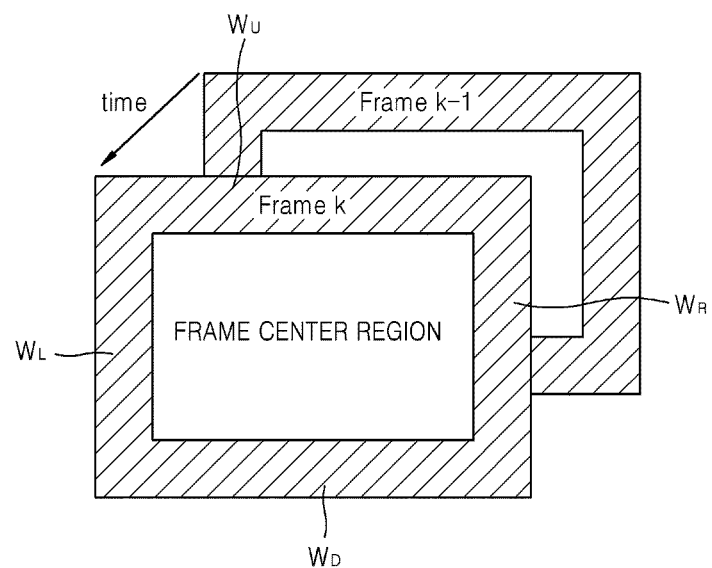
FIG. 3 is a pictorial diagram for describing setting up a sub-window.
Figure 4:
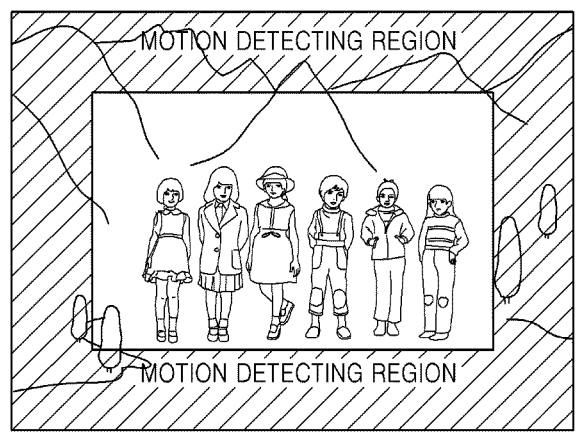
FIG. 4 is a pictorial screen shot showing an example picture in which a sub-window is set.

FIG. 2 is a block diagram showing a detailed configuration of the digital signal processing unit 150 for performing an intelligent self-timer operation. Referring to FIG. 2, the digital signal processing unit 150 includes a window setting unit 151, a motion calculating unit 140, and an image capture start determining unit 155 for determining whether to start an image capturing operation or not. The window setting unit 151 sets up suitable sub-windows within image frames Frame k−1 and Frame k The window setting unit 151 may set up suitable sub-windows along edges of the previous reference and current image frames Frame k−1 and Frame k in which an unwanted subject is likely to be located. As shown in FIG. 3, the window setting unit 151 can set up sub-windows $W_L$ and $W_R$ respectively in a left region and a right region that are surrounding the center region of a frame. Alternatively, the window setting unit 151 can set up sub-windows $W_L$, $W_R$, $W_U$, and $W_D$ respectively in left, right, upper, and lower regions of the previous reference and current image frames Frame k−1 and Frame k. The sub-windows $W_L$, $W_R$, $W_U$, and $W_D$ become candidate regions for detecting entry of an unwanted subject. Motion vectors are calculated in the set sub-windows $W_L$, $W_R$, $W_U$, and $W_D$, and it is determined whether an unwanted subject entered or not based on the motion vectors. As shown in FIG. 4, the left, right, upper, and lower regions of a frame, in which the sub-windows $W_L$, $W_R$, $W_U$, and $W_D$ are set up, become motion-detecting regions for detecting entry of an unwanted subject.

The motion calculating unit 140 compares a current image frame Frame k and a previous reference image frame Frame k−1 an image block-by-block to locate image blocks matching each other, and a motion vector is calculated from relative locations of the matching image blocks. More particularly, the motion calculating unit 140 moves a particular image block of the current frame Frame k on a corresponding region of the previous reference image frame Frame k−1 by pixels to locate a matching image block, and calculates motion vectors from relative locations of the matching image blocks. For example, since calculating motion vectors for all pixels causes delays in processing time, the Lucas-Kanade algorithm may be applied. According to the Lucas-Kanade algorithm, a Gaussian filter is repeatedly applied to two chronologically successive frames to remove unnecessary regions, and a desired number of feature points constituting edges or corners are chosen. Then, the most closely matching feature points between the two frames, the previous reference image frame Frame k−1 and the current image frame Frame k, are detected by using a least square method and a motion vector is calculated based on the detected feature points. For example, the motion calculating unit 140 may include an image converting unit 141 which extracts edge information of a subject from two chronologically successive frames, the current image frame Frame k and the previous reference image frame Frame k−1, in reference to the brightness distribution, a feature point extracting unit 143 which extracts feature points by applying a Gaussian filter to converted image data, a correlation coefficient calculating unit 145 which detects correlation coefficients between feature points to extract matching feature points between two chronologically successive frames, the current image frame Frame k and the previous reference image frame Frame k−1, and a motion vector calculating unit 147 which calculates motion vectors from matching feature points with the greatest correlation coefficients.

Figure 5A:
FIGS. 5A and 5B are images showing chronologically successive image frames.
Figure 5B:
Figure 6:
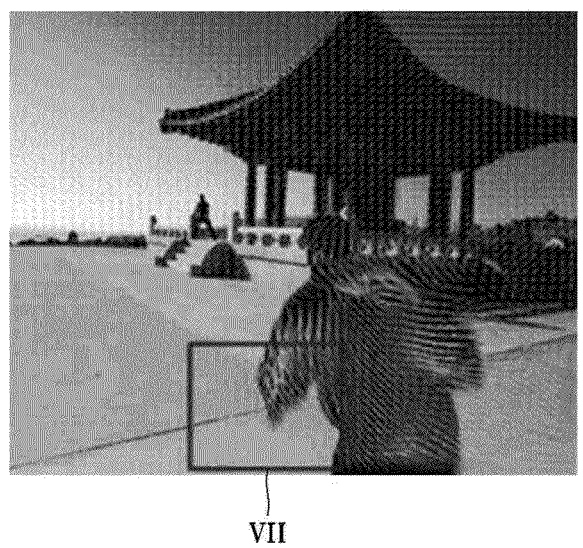
FIG. 6 is an image diagram showing optical flow detected from the image frames shown in FIGS. 5A and 5B.
Figure 7:
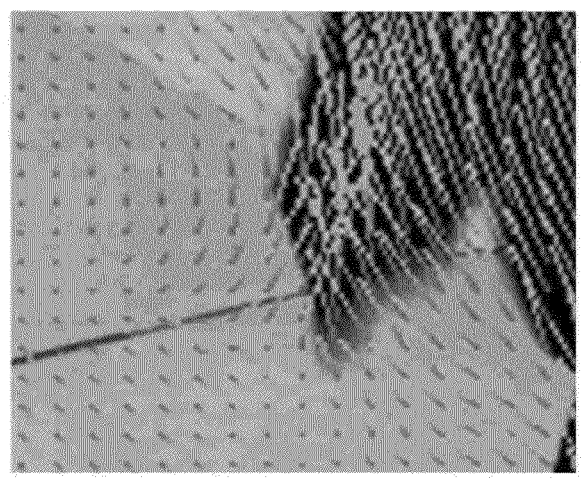
FIG. 7 is an image diagram showing optical flow in the region VII of FIG. 6 in closer detail.

FIGS. 5A and 5B show chronologically successive image frames, and FIG. 6 shows optical flow detected from the image frames shown in FIGS. 5A and 5B. Optical flow refers to an apparent motion, which is observed in chronologically successive image frames, indicated as a group of motion vectors, and can be calculated by applying the Lucas-Kanade algorithm. FIG. 7 shows optical flow in the region VII of FIG. 6 in closer detail. Referring to FIG. 7, it is clear that optical flow of a static subject is weak, whereas optical flow of a moving subject is strong. Although FIG. 6 shows optical flow of the entire region of an image frame, motion vectors may, for example, be detected mainly for edge regions of an image frame, in which sub-windows $W_L$, $W_R$, $W_U$, and $W_D$ are set, in consideration of time delay.

Referring to FIG. 2, the image capture start determining unit 155 reviews calculated motion vectors and determines whether an unwanted subject entered the sub-windows $W_L$, $W_R$, $W_U$, and $W_D$ or not. For example, the image capture start determining unit 155 calculates an average of a group of motion vectors calculated in the sub-windows $W_L$, $W_R$, $W_U$, and $W_D$ and compares the calculated average to an allowed degree of motion. Thus, the image capture start determining unit 155 can determine entry of an unwanted subject based on the comparison between the motion vectors and the allowed degree of motion. Alternatively, the image capture start determining unit 155 may compare the maximum motion vector calculated in sub-windows $W_L$, $W_R$, $W_U$, and $W_D$ and the allowed degree of motion and may determine whether an unwanted subject entered or not based on the comparison between the maximum motion vector and the allowed degree of motion.

The image capture start determining unit 155 determines a time point to capture an image based on whether an unwanted subject entered or not. Also, the image capture start determining unit 155 determines whether the self-timer time is over or not. As a self-timer mode is set, a self-timer 153 is initialized, and the time elapsed thereafter is calculated as the self-timer 153 is driven. The self-timer time is set by a user to postpone an image capturing operation until the self-timer time is over. When the self-timer time is over, the image capturing operation begins. However, a signal instructing the start of the image capturing operation is output when it is determined that there is no unwanted subject and the set self-timer time is over.

Figure 8:
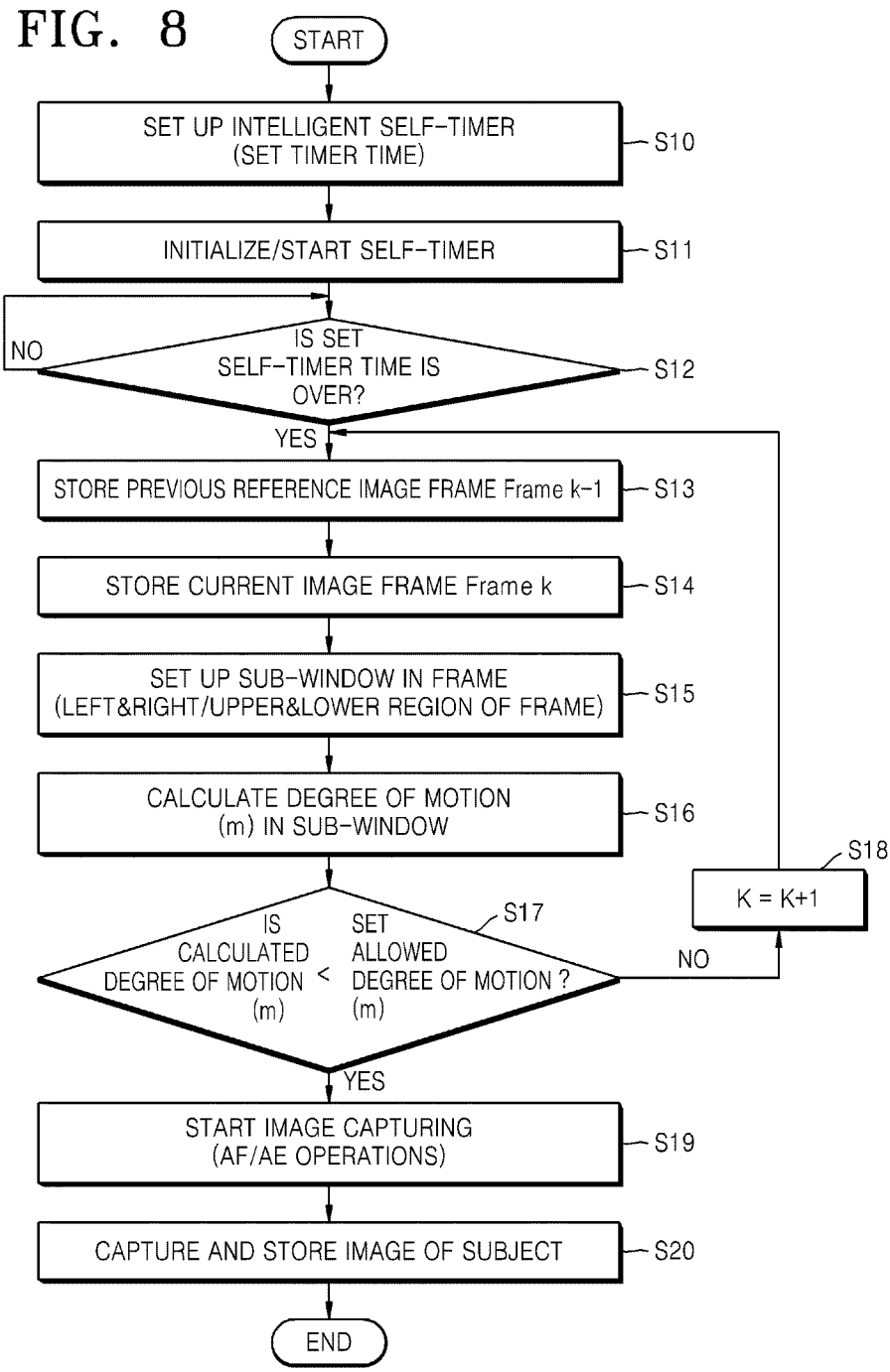
FIG. 8 is a flowchart of a method of controlling a digital camera, according to an embodiment of the present invention.

FIG. 8 is a flowchart of a method of controlling a digital camera, according to an embodiment of the present invention, and more particularly, a flowchart of intelligent self-timer operations. According to a request of a user, the digital signal processing unit 150 displays a self-timer setup screen and receives input of the user (operation S10). For example, the digital signal processing unit 150 may receive the user's settings for the self-timer time and the allowed degree of motion. Then, the self-timer 153 is initialized and driven to calculate elapsed time (operation S11). The digital signal processing unit 150 determines whether the self-timer time set by the user is over or not (operation S12), and calculates motion vectors from chronologically successive image frames, when the self-timer time is over (operations S13 through S16). First, a chronologically-preceding image frame Frame k−1 is stored in the memory 180 as a previous reference image frame Frame k−1, whereas a current image frame Frame k is stored in the memory 180 as a current image frame Frame k (operations 13 and 14). The memory 180 temporarily stores chronologically successive frames, the previous reference image frame Frame k−1 and the current image frame Frame k, and provides a workspace for calculating motion vectors. Alternatively, the previous reference image frame Frame k−1 and the current image frame Frame k may be stored in a frame memory integrated in the digital signal processing unit 150.

Next, suitable sub-windows may be set up on the two frames, the previous reference image frame Frame k−1 and the current image frame Frame k, that are obtained in a chronologically successive manner (operation S15). For example, the sub-windows $W_L$ and $W_R$ may be set up in a left region and a right region a frame, where entry of an unwanted subject is anticipated. Alternatively, the sub-windows $W_L$, $W_R$, $W_U$, and $W_D$ may be set up in left, right, upper, and lower regions of a frame. Then, a degree of motion m observed in the sub-windows $W_L$, $W_R$, $W_U$, and $W_D$ is detected. For example, feature points may be extracted by applying a Gaussian filter to the sub-windows $W_L$, $W_R$, $W_U$, and $W_D$, the most closely matching feature points between the two frames, the previous reference frame Frame k−1 and the current image frame Frame k, may be detected by using the least square method, and motion vectors may be calculated based on the detected feature points (operation S16).

Next, the degree of motion m detected in the sub-windows $W_L$, $W_R$, $W_U$, and $W_D$ and an allowed degree of motion M are mutually compared, and it is determined whether an unwanted subject entered or not based on the comparison between the degree of motion m and the allowed degree of motion M (operation S17). At this point, the degree of motion m may either be indicated as an average of motion vectors calculated in the sub-windows $W_L$, $W_R$, $W_U$, and $W_D$ or be indicated as the maximum value of motion vectors calculated in the sub-windows $W_L$, $W_R$, $W_U$, and $W_D$. More particularly, when the calculated degree of motion m and the allowed degree of motion M are mutually compared, it is determined that an unwanted subject entered if m>M, and it is otherwise determined that no unwanted subject entered if m<M. If it is determined that an unwanted subject entered, time steps are increased and motion vectors are calculated again. For example, a current image frame Frame k is stored as a previous reference image frame Frame k, a currently input image frame Frame k+1 is stored as a current image frame Frame k+1, and the series of operations for calculating the degree of motions observed in the current image frame Frame k+1 and the previous reference image frame Frame k and for determining whether an unwanted subjected entered or not are repeated (operations S13 through S17).

If it is determined that there is no unwanted subject between a camera and a subject, the digital signal processing unit 150 outputs a signal instructing the start of an image capturing operation. According to the signal, operations such as auto-focusing (AF) and auto-exposure (AE) may be performed, and an image of subject may be converted to a digital file and stored in the recording medium 170 (operations S19 and S20).

FIG. 9 is a flowchart of a method of controlling a digital camera, according to another embodiment of the present invention, and more particularly, a flowchart of intelligent self-timer operations. According to a request of a user, the digital signal processing unit 150 may display a self-timer setup screen and receive input of the user (operation P10). For example, the digital signal processing unit 150 may receive the user's settings for the self-timer time and the allowed degree of motion. Then, the self-timer 153 is initialized and driven to calculate elapsed time (operation P11).

Next, the digital signal processing unit 150 sequentially stores image frames that are successively output by the imaging device 120. For example, a previous frame Frame k−1 is stored in the memory 180 as a previous reference frame Frame k−1, and a current frame Frame k, which is successively output after the previous frame Frame k−1, is also stored in the memory 180 as a current frame Frame K (operations P12 and P13). For example, when sub-windows $W_L$, $W_R$, $W_U$, and $W_D$ are set up in left, right, upper, and lower regions of the image frames (operation P14) and degree of motions observed in the sub-windows $W_L$, $W_R$, $W_U$, and $W_D$ is to be calculated. More specifically, motion vectors can be detected by extracting feature points and locating feature points matching between the current frame Frame k and the reference frame Frame k−1, according to the Lucas-Kanade algorithm (operation P15). For example, it is determined whether an unwanted subject entered or not by mutually comparing a calculated degree of motion m and an allowed degree of motion M (operation P16). If it is determined that an unwanted subject entered, that is, if m>M, time steps are increased and motion vectors are calculated again. For example, a current image frame Frame k is stored as a previous reference frame Frame k, a currently input frame Frame k+1 is stored as a current image frame Frame k+1, and motion vectors between the current image frame Frame k+1 and the previous reference frame Frame k are detected (operations P12 through P16). Meanwhile, if it is determined that there is no unwanted subject between a camera and a subject, the digital signal processing unit 150 determines whether the self-timer time is over or not (operation P18). If it is determined that there is no unwanted subject and the self-timer time is not over, time steps are increased and motion vectors are calculated again. For example, a current image frame Frame k is stored as a previous reference frame Frame k, a currently input frame Frame k+1 is stored as a current image frame Frame k+1, and motion vectors between the current image frame Frame k+1 and the previous reference frame Frame k are calculated (operations P12 through P16). If it is determined that there is no unwanted subject and the self-timer time is over, an image capturing operation is started. For example, operations such as AF and AE are performed, and an obtained image is stored in the recording medium 170 (operations P19 and P20).

According to a digital camera and a method of controlling the same, an error of capturing an image of an unwanted subject can be prevented by performing intelligent self-timer operations, which include detecting entry of an unwanted subject into a subject composition, pausing an image capturing operation, and starting the image capturing operation after the unwanted subject is excluded. Accordingly, a desired image of a subject can be captured. Thus, product satisfaction with a digital camera can be improved, user inconveniences due to re-capturing images can be eliminated, and driving resources or memory resources of a digital camera can be saved.

The system or systems described herein may be implemented on any form of processor or processors and may be implemented as algorithms in software modules running on the processor or processors. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the processor, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A digital camera comprising:
   a motion calculating unit which calculates degree of motions observed in image frames that are obtained in a chronologically successive manner only after a single self-timer time period is over and the self-timer time period is not extended; and
   an image capture start determining unit which determines whether entry of an unwanted subject from outside of an image frame to inside of the image frame is detected from the calculated degree of motions and determines whether to start an image capturing operation based on the determination regarding the unwanted subject.

2. The digital camera of claim 1, further comprising:
   a window setting unit which sets up at least one sub-window in the image frame, and wherein the motion calculating unit calculates motion vectors only within the set sub-window.

3. The digital camera of claim 2, wherein the window setting unit sets the sub-window in at least one of left, right, upper, and lower border regions of an image frame.

4. The digital camera of claim 1, wherein, when there is no unwanted subject and the set self-timer time is over, the image capture start determining unit outputs a signal instructing the start of the image capturing operation.

5. The digital camera of claim 1, wherein the motion calculating unit extracts feature points constituting edges by applying a Gaussian filter, and calculates motion vectors from feature points matching between chronologically successive frames.

6. The digital camera of claim 1, wherein the image capture start determining unit mutually determines entry of an unwanted subject based on a comparison between the calculated degree of motion and a pre-set allowed degree of motion.

7. The digital camera of claim 6, wherein the pre-set allowed degree of motion is input by a user.

8. The digital camera of claim 1, wherein the self-timer time is input by a user.

9. A method of controlling a digital camera, the method comprising:
   determining whether a single set self-timer time is over;
   calculating motions observed in image frames that are obtained in a chronologically successive manner with a processor on the camera only after the single set self-timer time period is over and the single set self-timer time period is not extended;
   determining whether an unwanted subject entered an image from outside of an image frame to inside of the image frame based on the calculated motions; and
   determining whether to start an image capturing operation based on the determination regarding the unwanted subject.

10. The method of claim 9, wherein the determining of whether to start an image capturing operation or not comprises:
    outputting a signal, when there is no unwanted subject and the set self-timer time is over, instructing a start of the image capturing operation.

11. The method of claim 9, further comprising:
    setting up at least one sub-window in the image frame;
    wherein the calculating of motions observed in image frames comprises calculating motion vectors only within the set sub-window.

12. The method of claim 11, wherein the sub-window is set up in at least one of left, right, upper, and lower border regions of an image frame.

13. The method of claim 9, wherein the calculating of motions observed in image frames comprises:
    extracting feature points constituting edges by applying a Gaussian filter; and
    calculating motion vectors from feature points matching between chronologically successive frames.

14. The digital camera of claim 2, wherein the sub-window consists of a border region of the image frame.

15. The method of claim 11, wherein the sub-window consists of a border region of the image frame.

16. A digital camera comprising:
    a motion calculating unit which calculates degree of motions observed in image frames that are obtained in a chronologically successive manner only after a set self-timer time is over; and
    an image capture start determining unit which determines whether entry of an unwanted subject from outside of an image frame to inside of the image frame is detected from the calculated degree of motions and determines whether to start an image capturing operation based on the determination regarding the unwanted subject.

* * * * *